United States Patent [19]

Hardy et al.

[11] 4,417,637

[45] Nov. 29, 1983

[54] AIR CUSHION VEHICLE

[75] Inventors: Derek J. Hardy; Michael W. Eldridge, both of Cowes, England

[73] Assignee: British Hovercraft Corporation Ltd., Yeovil, England

[21] Appl. No.: 349,610

[22] Filed: Feb. 17, 1982

[30] Foreign Application Priority Data

Feb. 20, 1981 [GB] United Kingdom ................ 8105518

[51] Int. Cl.³ .............................................. B60V 1/18
[52] U.S. Cl. ................................ 180/116; 248/188.5; 254/423; 280/766.1
[58] Field of Search ........................... 180/116, 119; 280/763.1, 766.1; 254/86 H, 86 R, 423; 248/188.5, 188.8, 532, 352; 52/118, 126.6, 632, 745

[56] References Cited

U.S. PATENT DOCUMENTS 3,702,181 11/1972 Keller et al. .................... 254/86 H

FOREIGN PATENT DOCUMENTS 942357 2/1974 Canada ................................ 180/116

Primary Examiner—John A. Pekar
Assistant Examiner—D. Lynn Fugate
Attorney, Agent, or Firm—Larson and Taylor

[57] ABSTRACT

Inspection and repair of an air cushion vehicle flexible skirt is carried out with the vehicle supported above a ground surface on support legs projecting from sleeve members built into rigid base structure of the vehicle so as to be open between upper and lower surfaces of the base structure. The vehicle lift system is used to hover the vehicle clear of the ground so that the support legs can be secured in their projecting positions. Alternatively, jacks may be supported over the sleeves and used to force the support legs down the sleeve members to their projecting positions. The vehicle may be further raised above the ground surface to permit inspection and repair of the underside of the rigid base structure by first replacing each support leg with a support stand and pillar assembly and then using the jacks to raise the vehicle with the support legs resting on the pillars.

7 Claims, 5 Drawing Figures

AIR CUSHION VEHICLE

DESCRIPTION OF INVENTION

This invention relates to air cushion vehicles (A.C.V.) and is more particularly concerned with apparatus for supporting an A.C.V. above a ground surface when the A.C.V. is non-cushionborne.

Up until the present time each of our A.C.V.'s has been equipped with a number of landing pads built onto the underside of the A.C.V. rigid base structure. The number and location of the landing pads is, in general, dictated by the supporting structure, the arrangement of skirt sub-dividers, and the need to be able to land on the crest of a one in ten slipway without damaging the bottom of the A.C.V. The number of landing pads involved varies from four on an A.C.V. of the Winchester Class (SR.N6) having an all-up weight in the order of 10 tons, and an A.C.V. of the Wellington Class (BH.7) having an all-up weight in the order of 45 tons, up to seven on an A.C.V. of the Mountbatten Class (SR.N4) having an all-up weight in the order of 200 tons. In addition to the landing pads, A.C.V.'s of the Winchester and Wellington Classes have attachment points which allow a separate external jacking system to be fitted to lift the A.C.V. for skirt inspection and repair, and they also have lifting points to allow the A.C.V. to be slung from a crane or a straddle carrier. On the other hand, a large A.C.V. of the Mountbatten Class is generally lifted by hydraulic jacks provided in hard-standing service areas at shore bases, the jacks lifting the A.C.V. via landing pads, although there is provision for a secondary portable hydraulic system to be fitted for emergency lifts when quickness is not of major concern.

An A.C.V. at present being designed and being of a size between the Winchester and Wellington A.C.V.'s would demand a large and expensive straddle carrier for rapid overnight servicing of the A.C.V. flexible skirt. The external jacking system as used for the Winchester and Wellington A.C.V.'s is both expensive and slow in operation in respect to normal civil demands.

It is an object of the present invention to provide apparatus for supporting an A.C.V. above a ground surface in a non-cushionborne condition which is inexpensive to manufacture and easy to use.

It is a further object of the invention to provide apparatus for supporting an A.C.V. above a ground surface in a non-cushionborne condition which can be carried by the A.C.V. so as to be available for use at substantially any ground station having a suitable hardstanding area.

In its broadest aspect the present invention provides apparatus for supporting an air cushion vehicle above a ground surface in a non-cushionborne condition comprising a plurality of sleeve members each adapted to be built into rigid base structure of the vehicle so as to extend between an upper end which opens at an upper surface of the rigid base structure and a lower end which opens at an under surface of the rigid base structure, a plurality of support legs adapted to be slidably received one in each sleeve member so as to extend therethrough and project from the lower end of the sleeve member, and locking means for securing each support leg in its projected position relative to the sleeve member.

In another aspect the present invention provides an air cushion vehicle including a rigid base structure having an under surface facing towards a ground surface over which the vehicle operates and an upper surface facing away from said ground surface, characterised by a plurality of sleeve members built into the rigid base structure, and each extending between an upper end which opens at the upper surface of the rigid base structure and a lower end which opens at the under surface of the rigid base structure, each sleeve member being adapted to receive a support leg passed into the upper end of the sleeve member so as to extend therethrough and project from the lower end of the sleeve member, and locking means securing each support leg in its projected position relative to the sleeve member.

The locking means for each support leg may comprise a split collar adapted for engagement with a flange on the upper end of the sleeve member and a locking ring engageable with the split collar.

Means may be provided for supporting a jack above the upper end of each sleeve member and a thrust rod projecting externally of the jack may be adapted for co-operation with the support leg so that the vehicle may be lifted by extending the jacks and forcing the support legs down.

Whilst the locking means may be incorporated in the jacks by making them irreversible, for example, screw jacks, we prefer that the jacks are hydraulic and that positive locking means are provided for securing the support legs in their projected positions relative to the sleeve members.

Power for the hydraulic jacks may be supplied by a source separate from the vehicle or a source on the vehicle, alternatively, the hydraulic jacks could be manually operated.

Support stands may be provided for placement beneath the vehicle when it is supported on the support legs and these support stands may be shaped to fit about the support legs. With the support stands in position the support legs may be withdrawn into the vehicle and replaced by pillars which co-operate with the support stands. If desired, the vehicle may then be jacked to a greater height with the support legs resting on the pillars.

The sleeve members built into the rigid base structure are preferably co-axial with bores through landing pad structures built onto the underside of the rigid base structure.

To minimise the weight penalty and to ensure that the vehicle rests steadily on uneven ground, we prefer to limit the number of support legs to three, one being on the vehicle longitudinal centerline towards the forward end of the vehicle and the other two being positioned one on either side of the vehicle longitudinal centerline towards the rear of the vehicle.

The invention will now be further described by way of example and with reference to the accompanying drawings, in which.

Figure 1:
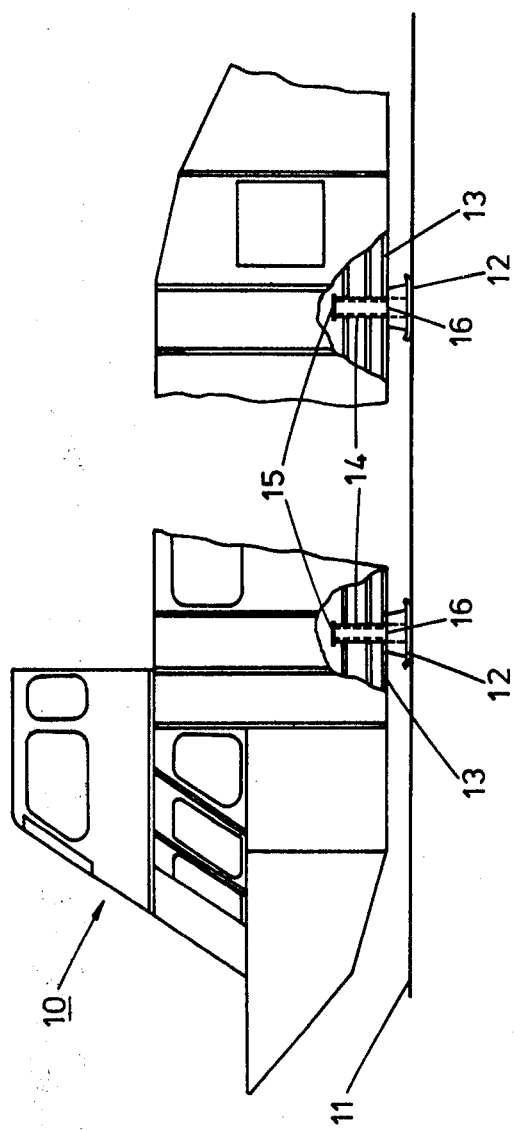
FIG. 1 is a side elevation of part of the rigid body structure of an A.C.V. with the flexible skirt assembly omitted and the rigid body structure broken away in two places to show sleeve members built into the structure at the positions of landing pads provided on the underside of the structure.
Figures 2, 3:
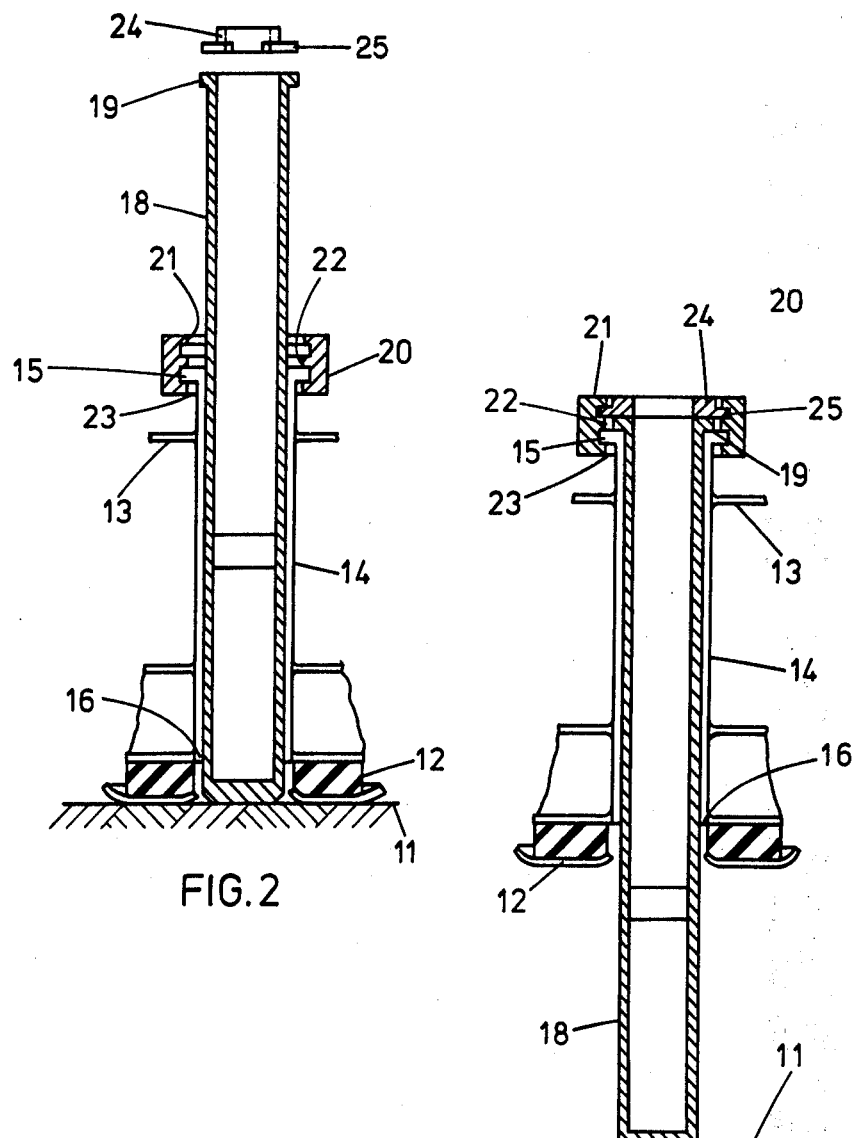
FIG. 2 is a sectional view of a sleeve and associated landing pad when the landing pad is resting on a ground surface with a support leg housed in the sleeve member.
FIG. 3 is a sectional view similar to FIG. 2 with the support leg projecting from the lower end of the sleeve member so as to support the A.C.V. above the ground surface.

Referring first to FIGS. 1, 2 and 3 of the drawings, FIG. 1 shows part of the rigid body structure 10 of an A.C.V. A flexible skirt normally attached to the rigid body structure 10 so as to depend downwardly therefrom and surround the air cushion that in operation is formed between the underside of the rigid body structure 10 and a ground surface 11 is omitted to show landing pads 12 on which the A.C.V. stands on the ground surface 11 when non-operational. The landing pads 12 are built onto the under surface of a buoyancy tank structure 13 which forms rigid base structure of the rigid body structure 10. The rigid body structure is shown cut away in local areas to reveal sleeve members 14 which are built into the buoyancy tank structure 13 so as to extend between an upper flanged end 15 which opens above an upper surface of the buoyancy tank structure 13 within the rigid body structure 10 and a lower end 16 which opens at the under surface of the buoyancy tank structure 13. Each sleeve member 14 is arranged to be coaxial with a bore through the landing pad 12 with which it is associated, whereby communication is provided between the interior of the rigid body structure 10 and the ground surface 11. In cushionborne operation of the A.C.V. each sleeve member is closed off at its upper flanged end 15 by a capping member (not shown), so that pressurised cushion air does not enter the interior of the rigid body structure 10. The A.C.V. is provided with three landing pads 12 and associated sleeve members 14, one landing pad and associated sleeve member being located on the longitudinal centerline of the A.C.V. towards the forward end of the A.C.V. and the other two landing pads and associated sleeve members being positioned towards the rear of the A.C.V. one at either side of the longitudinal axis of the A.C.V., only two being visible in FIG. 1.

When the A.C.V. is set down on the ground surface 11, as shown in FIG. 1, and it is desired to inspect the flexible skirt assembly for damage or wear, a tubular support leg 18 is slid into each sleeve member 14 from the upper flanged end 15 until the lower end of the support leg 18 comes to rest on the ground surface 11, as is shown in FIG. 2. The support leg 18 has a closed lower end and an open upper end which is provided with a flange 19. A split collar 20 having three inwardly projecting flanges 21, 22 and 23 is clamped around the upper flanged end 15 of the sleeve member 14, so that the flange on the upper end of the sleeve member is housed between the middle and lower flanges 22 and 23, respectively, of the split collar 20, the two halves of the collar being secured to each other by studs and nuts (not shown).

The A.C.V. lift system is then switched on and the A.C.V. is hovered clear of the ground surface 11 so that the support legs 18 slide down through the sleeve members 14 and the flange 19 at the upper end of each support leg 18 comes to rest on the upper flanged end 15 of the sleeve member 14 in which the support leg is received. A locking ring 24 having outwardly projecting tongues 25 is located over the upper flange 21 of the split collar 20 so that the tongues 25 are aligned with cutaway portions in the flange 21 of the split collar 20. The locking ring 24 is then dropped onto the flange 19 of the support leg 18 and rotated using a lever (not shown) to locate the tongues 25 beneath the upper flange portion 21 of the split collar 20, as is shown in FIG. 3. The A.C.V. lift system is switched off so that as the supporting air cushion decays the A.C.V. sets down on the support legs 18. The A.C.V. is then supported with the under surface of the buoyancy tank structure 13 at a height above the ground surface 11 which is dependent upon the dimension by which the support legs 18 project from the lower end 16 of the sleeve member 14. This permits the cushion containing flexible skirt (not shown) to hang down without being trapped between the underside of the buoyancy tank structure 13 and the ground surface 11 so that the skirt can be inspected and, if necessary, repaired. After any necessary skirt maintenance, the A.C.V. is again hovered, the locking rings 24 are removed, and the support legs 18 withdrawn from the sleeve members 14.

Figure 4:
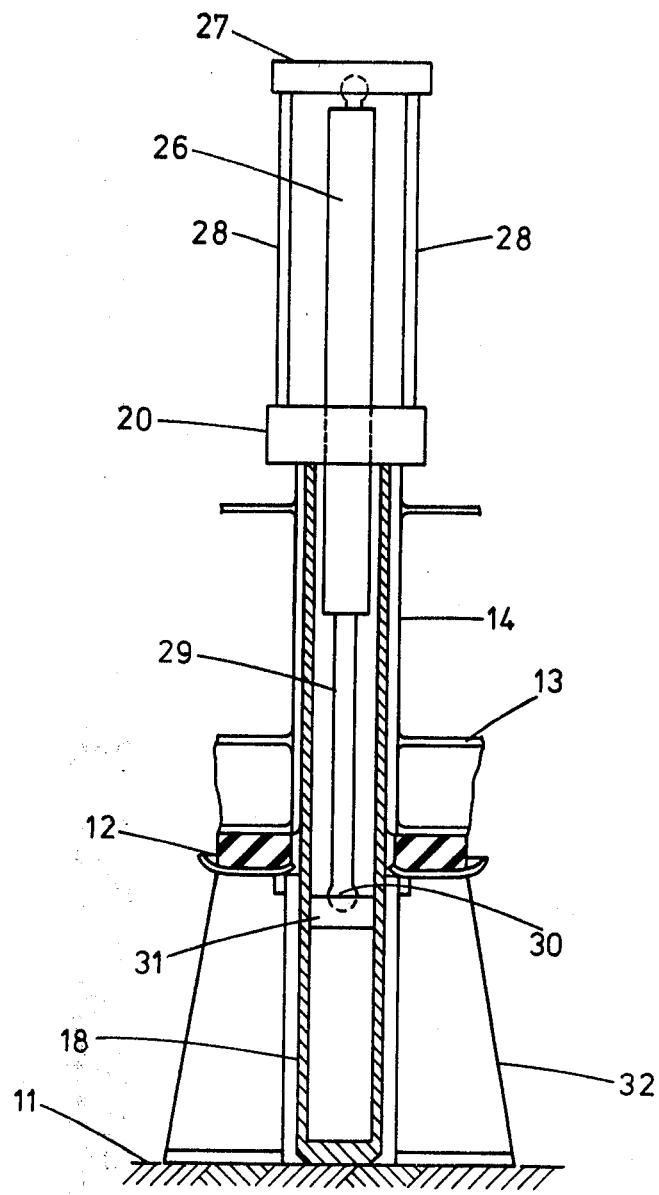
FIG. 4 is a sectional view similar to FIG. 3 with a hydraulic jack supported above the upper end of the sleeve member and a support stand positioned beneath the vehicle so as to partially surround the support leg.

Should it be required to raise the A.C.V. on the support legs 18 when no power is available from the A.C.V. lift system, or the A.C.V. is within the confines of a workshop, a hydraulic jack 26 is supported above the upper flanged end 15 of each sleeve member 14 by a yoke member 27 which is spaced from the split collar 20 by tie rods 28 having opposed ends screwed into the yoke member 27 and the split collar 20, as shown in FIG. 4, the split collar 20 having first been attached to the upper flanged end 15 of the sleeve member 14 and the support leg 18 slid into the sleeve member 14 as previously described with reference to FIG. 2. The locking ring 24 is also positioned on the flange 19 at the upper end of the support leg 18 before assembly of the jack 26 and, on assembly, a part of the body portion of the jack 26 together with a projecting thrust rod 29 is passed through the locking ring 24 into the support leg 18 so that a ball end 30 provided at the end of the thrust rod 29 co-operates with a suitable recess in a cross member 31 fixed internally of the support leg 18. Hydraulic power is then applied to the jacks 26 from a suitable source, such as a generator (not shown) separate from the A.C.V., to force the support legs 18 down through the sleeve members 14 until the flange 19 at the upper end of each support leg 18 contacts the flanged upper end 15 of the sleeve member 14. The locking ring 24 having simultaneously moved downwardly with the support leg 18 is rotated to lock the support leg 18 in the projecting position.

Figure 5:
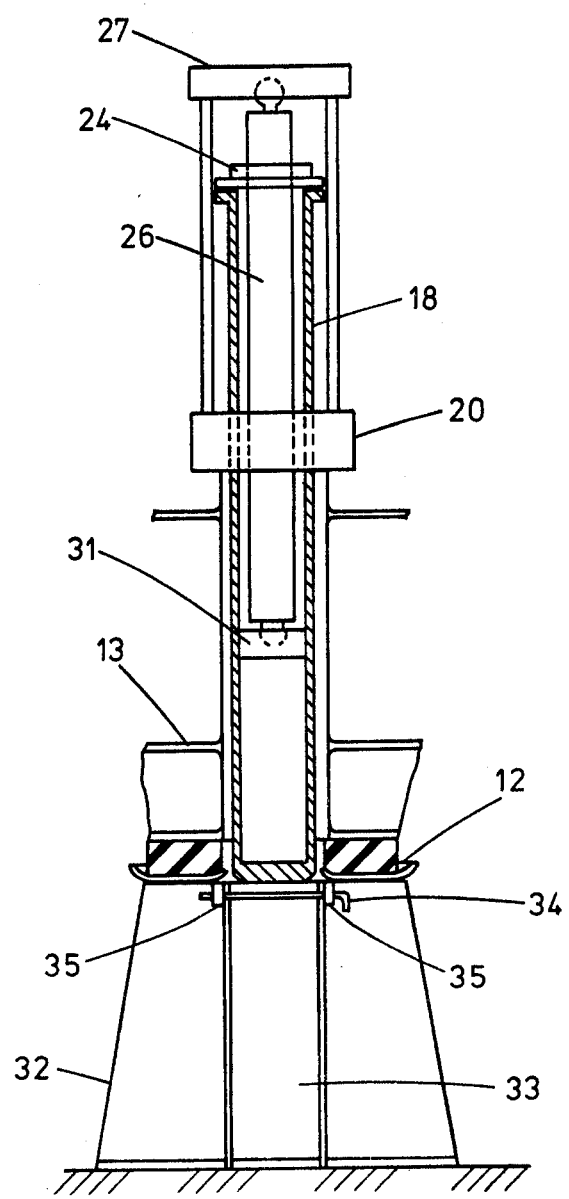
FIG. 5 is a sectional view similar to FIG. 4 with the support leg retracted and replaced by a pillar which co-operates with the support stand.

As is also shown in FIG. 4, a support stand 32 of U-shape when viewed in plan, may be positioned beneath the under surface of the buoyancy tank structure 13 so as to fit about the support leg 18. With support stands 32 in place at the position of each support leg 18, the locking rings 24 may be released and the support legs 18 retracted into the sleeve members 14 so that the A.C.V. sits on the support stands 32. A tubular pillar member 33 may then be positioned in the recessed portion of each support stand 32, as shown in FIG. 5, to replace the support leg 18. The pillar 33 is held against toppling out of the support stand 32 by a pin 34 which passes through aligned holes in lugs 35 on the support stand 32. With the lower end of each support leg 18 resting on the upper end of a pillar 33, as shown in FIG. 5, the A.C.V. may be raised further above the ground surface 11 by again using the hydraulic jacks 26 to force the support legs 18 down through the sleeve members 14 until the flange 19 at the upper end of the support leg 18 again contacts the flanged upper end 15 of the sleeve members 14 when the locking rings 24 may again be used to lock the support legs. By this means the A.C.V. is then supported at twice the height above the ground surface 11 as that at which it is supported if the support legs 18 are resting on the ground surface 11.

Thus the present invention provides simple apparatus for use in supporting an A.C.V. at a first height above a ground surface without the requirement for complex and expensive lifting gear. By making use of the A.C.V. lift system to hover the A.C.V. whilst the support legs are secured in their projecting positions the support legs can be carried with the A.C.V. and are available for jacking the A.C.V. at any ground station having suitable hardstanding.

The hydraulic jacks required to lift the A.C.V. when no power is available from the lift system or when it is required to lift the A.C.V. further above the ground surface using the support stands and pillars, together with a generator for supplying hydraulic power to the jacks, can readily be transported by the A.C.V. to a remote ground station for use whilst the A.C.V. is operating from that station.

Whilst in the embodiment of the invention hereinbefore described with reference to and shown in the accompanying drawings, hydraulic jacks have been described as providing the jacking means, alternative jacking means may be provided, such as by screw jacks which being irreversible could also constitute the locking means to the exclusion of the locking rings.

What is claimed is:

1. An air cushion vehicle (A.C.V.) including a rigid base structure having an under surface facing towards a ground surface over which the vehicle operates and an upper surface facing away from said ground surface, a plurality of sleeve members built into the rigid base structure and each extending between an upper end which opens at the upper surface of the rigid base structure and a lower end which opens at the under surface of the rigid base structure and which is co-axial with a bore through a landing pad structure attached to the under surface of the rigid base structure, each sleeve member being adapted to receive a support leg passed into the upper end of the sleeve member so as to extend therethrough and project from the lower end of the sleeve member, and locking means for securing each support leg in its projected position relative to the sleeve member.

2. An A.C.V. as claimed in claim 1, wherein each locking means comprises a split collar adapted for engagement with a flange on the upper end of the sleeve member and a locking ring engageable with the split collar.

3. An A.C.V. as claimed in claim 1 or claim 2, further comprising means for supporting a jack above the upper end of each sleeve member, a thrust rod projecting externally of the jack being adapted for co-operation with the support leg whereby the vehicle may be lifted by extending the jacks and forcing the legs down.

4. An A.C.V. as claimed in claim 3, wherein the jacks are hydraulic.

5. An A.C.V. as claimed in claim 1, further comprising support stands adapted for placement beneath the vehicle when it is supported on the support legs and shaped to fit about the support legs.

6. An A.C.V. as claimed in claim 5, further comprising pillars adapted for co-operating with the support stands to replace the support legs.

7. An air cushion vehicle (A.C.V.) including a rigid base structure having an under surface facing towards a ground surface over which the vehicle operates and an upper surface facing away from said ground surface, a plurality of sleeve members built into the rigid base structure and each extending between an upper end which opens at the upper surface of the rigid base structure and a lower end which opens at the under surface of the rigid base structure, each sleeve member being adapted to receive a support leg passed into the upper end of the sleeve member so as to extend therethrough and project from the lower end of the sleeve member, and locking means for securing each support leg in its projected position relative to the sleeve member including a split collar adapted for engagement with a flange on the upper end of the sleeve member and a locking ring engageable with the split collar.

* * * * *